US007492282B2

(12) United States Patent
Danz et al.

(10) Patent No.: US 7,492,282 B2
(45) Date of Patent: Feb. 17, 2009

(54) METHOD AND DEVICE FOR DETERMINING THE SIZE AND POSITION OF A PARKING SPACE

(75) Inventors: Christian Danz, Stuttgart (DE); Michael Seiter, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/570,188

(22) PCT Filed: Aug. 18, 2004

(86) PCT No.: PCT/EP2004/051832

§ 371 (c)(1),
(2), (4) Date: Dec. 8, 2006

(87) PCT Pub. No.: WO2005/024463

PCT Pub. Date: Mar. 17, 2005

(65) Prior Publication Data

US 2007/0075875 A1 Apr. 5, 2007

(30) Foreign Application Priority Data

Aug. 28, 2003 (DE) ................................ 103 39 645

(51) Int. Cl.
*B60Q 1/48* (2006.01)

(52) U.S. Cl. ........................ 340/932.2; 342/70; 342/27; 342/59

(58) Field of Classification Search ............... 340/932.2
See application file for complete search history.

(56) References Cited

U.S. PATENT DOCUMENTS 5,060,205 A * 10/1991 Phelan ........................ 367/98
5,701,122 A 12/1997 Canedy
5,714,928 A 2/1998 Nagai et al.
7,095,361 B2 * 8/2006 Mattes et al. ................. 342/70
2003/0004617 A1 * 1/2003 Kimura et al. ................. 701/1

FOREIGN PATENT DOCUMENTS

| | | |
|---|---|---|
| CN | 1394773 | 2/2003 |
| DE | 38 13 083 | 11/1989 |
| DE | 101 46 712 | 4/2003 |
| JP | 6 127318 | 5/1994 |

* cited by examiner

*Primary Examiner*—Jeff Hofsass
*Assistant Examiner*—Ojiako Nwugo
(74) *Attorney, Agent, or Firm*—Kenyon & Kenyon LLP

(57) ABSTRACT

The present invention relates to a method and a device for determining the size and position of a parking space in relation to the position of a vehicle while the vehicle is driving past the parking space, the parking space extending longitudinally to the traffic lane and transversely to the traffic lane. It is the objective of the present invention to provide an ultrasound-based system for parking space measurement that operates more precisely than the known ultrasound-based systems for parking space measurement, even when passing the parking space at high speed and given high sensing depth of the parking space. Due to the fact that the width of the parking space is determined with the aid of a first ultrasonic sensor having a first sensitivity, and the depth of the parking space is detected with the aid of a second ultrasonic sensor having a second sensitivity, the sensitivity of the first ultrasonic sensor being lower than the sensitivity of the second ultrasonic sensor, it is possible to achieve higher accuracy in the parking space measurement.

11 Claims, 2 Drawing Sheets a) b) c)

a)
b)
c)
10
11
12
14
15
16
20
22
24
26
28
30

METHOD AND DEVICE FOR DETERMINING THE SIZE AND POSITION OF A PARKING SPACE

FIELD OF THE INVENTION

The present invention relates to a method and a device.

BACKGROUND INFORMATION

Increasing traffic density and greater development of open spaces restrict traffic space more and more, especially in congested urban areas. The available parking space becomes tighter, so that the driver has to cope not only with the demands of increasing traffic volume, but faces additional stress from the search for a suitable parking space. Estimating the exact size and position of the parking space, in particular during back-up parking into a parking space, is often quite difficult.

All types of devices are known to make parking easier for the driver of a vehicle, for instance by parking space measurement, or a semi-autonomous or fully autonomous parking assistant.

Once a suitable parking space has been located, the semi-autonomous parking system calculates the optimal maneuvering path as a function of the position and size of the parking space. With the aid of a suitable interface (optical, acoustical or haptical), the driver is given information about the way he has to steer and accelerate or brake in order to enter the parking space in an optimal manner. The deviations from the setpoint trajectory are compensated by the driver himself or adjusted automatically. The longitudinal movement is generally determined by the driver. Steering may also be implemented automatically, the driver being responsible merely for accelerating and braking.

In order to be able to calculate the setpoint trajectory of the maneuvering path, both the position of the parking-space delimiters must be determined very accurately and the depth and shape of the parking space has to be determined very precisely.

A device for determining a parking-space boundary is known from U.S. Pat. No. 5,701,122. Optical sensors are utilized to sense the distance of a fixed object. However, the aforementioned approach has the disadvantage that the use of optical sensors causes considerable expense. Furthermore, it is disadvantageous that the optical sensors are highly susceptible to failure, especially when the vehicle exterior is dirty.

To overcome the aforementioned disadvantages, it is known to utilize ultrasonic sensors for the detection or for the distance measurement of objects in the vicinity of a vehicle, since these sensors are relatively inexpensive. A disadvantage of the known systems for parking space measurement space based on ultrasound is their low accuracy, which considerably restricts their practical use. Especially when passing the parking space to be measured at a high speed (up to 30 km/h), the accuracy of the known parking-space measurement systems based on ultrasound is not up to the task.

SUMMARY OF THE INVENTION

It is the objective of the present invention to provide an ultrasound-based system for parking space measurement that operates more precisely than the ultrasound-based systems for measuring parking spaces known from the related art, even when passing the parking space at high speed (up to 30 km/h), and given high parking-space sensing depth (up to 5 m).

The method according to the present invention is characterized by the following method steps:

determining the width of a parking space with the aid of a first ultrasonic sensor having a first sensitivity; and determining the depth of a parking space with the aid of a second ultrasonic sensor having a second sensitivity, the sensitivity of the first ultrasonic sensor being lower than the sensitivity of the second ultrasonic sensor.

Since the parking space is measured by sensors having different sensitivity, greater accuracy is able to be achieved. The first ultrasonic sensor preferably has a smaller detection range than the second ultrasonic sensor. In a preferred variant of an embodiment, the detection range of the first ultrasonic sensor amounts to 3 m, and the detection range of the second ultrasonic sensor amounts to 5 m.

It is especially the location of the obstacles that delimit the parking space in its width and which are situated closest to the center of the lane that play the greatest role in calculating the setpoint trajectory of the driving path. For that reason the present invention provides for a first sensor having relatively low sensitivity to be arranged preferably at the front of the vehicle. The sensitivity of this first sensor is set to be relatively low, so that a highly restricted field of vision results for this sensor, which allows reliable localization of the obstacles that delimit the parking space and are located closest to the center of the traffic lane. The first sensor is preferably aligned at approximately 75° to 80° with respect to the longitudinal vehicle axis, thereby allowing an especially optimal sensing of a rear corner of a parking vehicle, which generally constitutes an obstacle delimiting a parking space.

A second sensor which has relatively high sensitivity and is preferably arranged at the rear of the vehicle at an angle of 90° with respect to the longitudinal axis of the vehicle, is used mainly to accurately detect the specific obstacles which delimit the parking space and are located further away from the center of the traffic lane, for example the curb. By adapting the sensitivity parameters, the detection field of this second sensor is selected to realize a high detection range, i.e., the sensor is set to be highly sensitive. Suitable selection of the sensitivity characteristic curve in the range of 0.6 m to 1.2 m ensures that no—or hardly any—ground echoes occur in the sensor signal. For an excellent detection of the obstacle delimiting the depth of the parking space—in most cases a curb—, the second sensor is preferably aligned at an angle of 90° relative to the longitudinal vehicle axis.

Adjusting a relatively low sensitivity for the first sensor and a higher sensitivity for the second sensor also accomplishes that the first sensor is less likely than the second sensor to detect ground echoes. In the overlapping detection region of both sensors (up to approximately 3 m), the ground echo values may be filtered by analyzing both distance signals on the basis of path signal sensors, which considerably improves the quality of the parking-space measurement. For this purpose position fixing of the sensors is implemented on the basis of the evaluation of a wheel-pulse counter. Storing the data of the first sensor allows filtering of the ground echo values if the data of the second sensor have been recorded. A prerequisite for such filtering is that actual obstacles are able to be detected by the less sensitive first sensor. This may be ensured by suitable selection of the first sensor's sensitivity parameters.

According to an especially preferred development of the present method, the detection range of the first ultrasonic sensor amounts to 3 m or virtually 3 m, and the detection range of the second ultrasonic sensor amounts to 5 m or virtually 5 m in transverse parking; in longitudinal parking, the detection range of the first ultrasonic sensor amounts to 2 m or virtually 2 m, and the detection range of the second ultrasonic sensor amounts to 3.5 or virtually 3.5 m.

A device according to the present invention for determining the size and position of a parking space is characterized by at least two ultrasonic sensors having different sensitivities. The ultrasonic sensors preferably have different detection ranges. In an especially preferred variant of a development, the first ultrasonic sensor is arranged in the lateral front region of a vehicle, and the second ultrasonic sensor is arranged in the lateral rear region of a vehicle.

In an especially preferred variant of a development, the first ultrasonic sensor is aligned at an angle of approximately 70° to 80° relative to the longitudinal axis of the vehicle, and/or the second ultrasonic sensor is aligned at an angle of 90° or virtually 90° relative to the longitudinal axis of the vehicle.

One advantage of the present invention is that the device may be used both on the right and the left side of the vehicle. An arrangement on both sides is possible as well.

DETAILED DESCRIPTION

Figure 1:
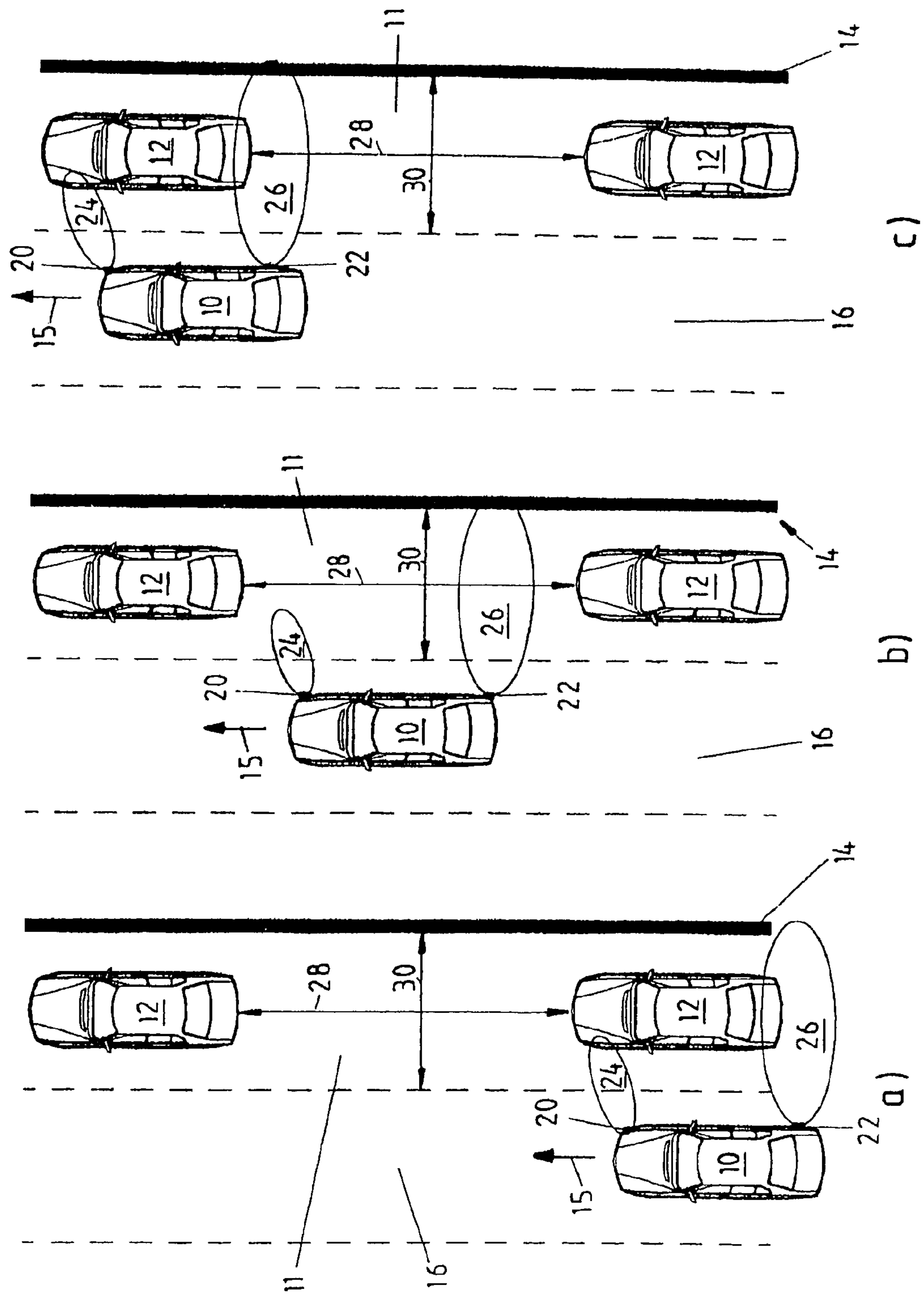
FIG. 1*a* shows a schematic representation of a vehicle having the device according to the present invention for determining the size and position of a parking space, at the beginning of driving past the parking space.
FIG. 1*b* shows a schematic representation of a vehicle having the device according to the present invention for determining the size and position of a parking space, while driving past the parking space.
FIG. 1*c* shows a schematic representation of a vehicle having the device according to the present invention for determining the size and position of a parking space, at the end of driving past the parking space.
Figure 2:
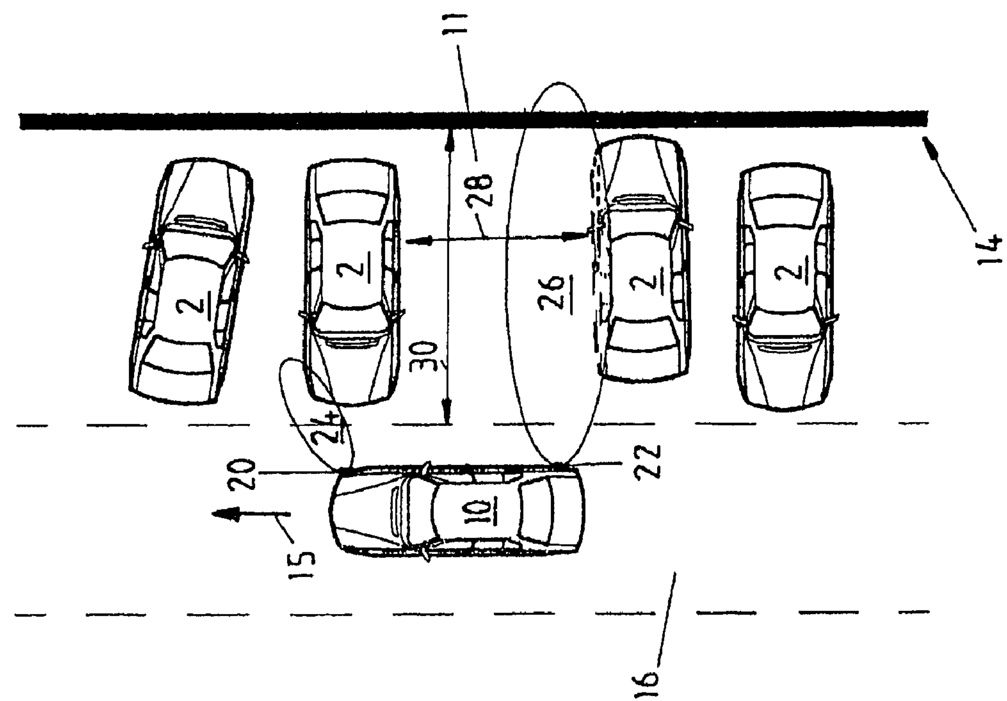
FIG. 2*a* shows a schematic representation of a vehicle having a device according to the present invention for determining the size and position of a parking space, prior to driving past a transversely aligned parking space.
FIG. 2*b* shows a schematic representation of a vehicle having a device according to the present invention for determining the size and position of a parking space, while driving past a transversely aligned parking space.
Figure 2:
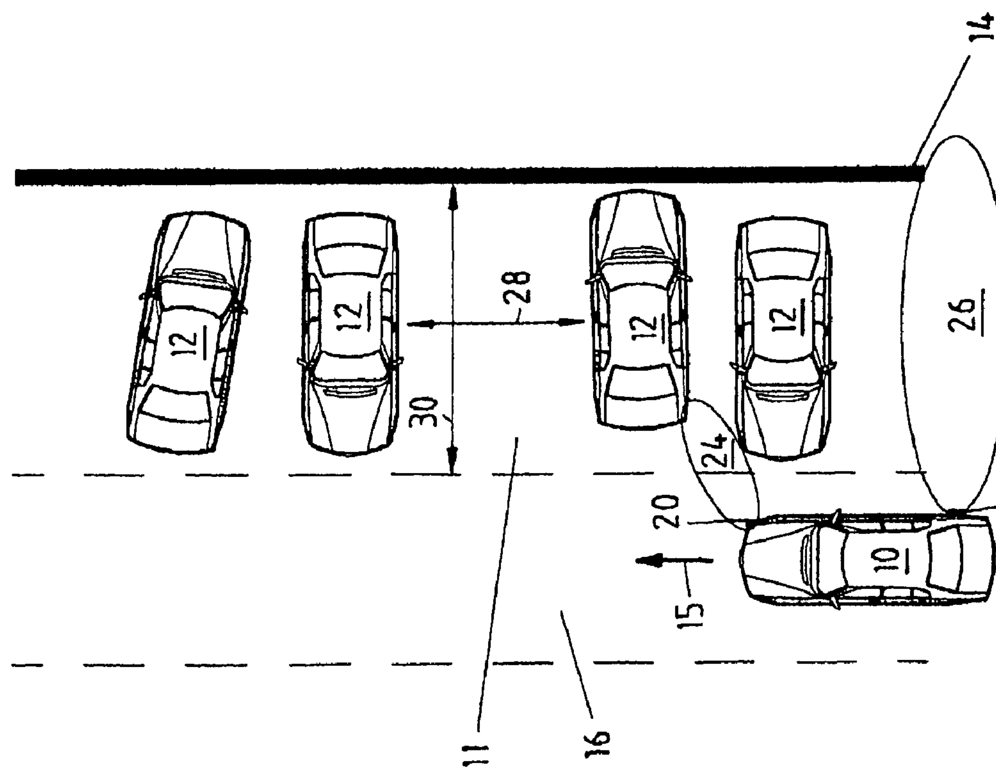

Shown in FIG. 1*a* in schematic form is the beginning of a rearwardly directed parking operation of a vehicle 10. For correct parking, vehicle 10 driving on lane 16 in driving direction 15 needs a parking space of sufficient width and depth. To ascertain whether the size of parking space 11 is sufficient for vehicle 10, width 28 of parking space 11 as well as depth 30 of parking space 11 are determined while vehicle 10 is driving past parking space 11. The exact position of parking space 11 and its dimensions (width 28 and depth 30) must be determined with the utmost precision in order to be able to supply the corresponding data to an autonomous/semi-autonomous parking assistant. If, for instance, the lateral front or rear regions of vehicles 12 delimiting width 28 of parking space 11 are detected incorrectly or with insufficient precision, a collision with one of vehicles 12 may result when following the setpoint trajectory (parking path) calculated by the parking assistant. To be able to determine a position and size of parking space 11 as accurately as possible using inexpensive ultrasonic sensors, the present invention provides for two ultrasonic sensors 20, 22 to be arranged on vehicle 10. Ultrasonic sensor 20 has a detection range 24 that has smaller dimensions. This detection range 24 amounts to approximately 3 m in its longitudinal extension. First sensor 20 is located on the right front of vehicle 10 at an angle of approximately 70° to 85° with respect to the longitudinal axis of the vehicle. In contrast, second sensor 22 has a larger detection range 26 of approximately 5 m (longitudinal extension). In addition, second sensor 22 is disposed at the rear of vehicle 10 at an alignment of 90° with respect to the longitudinal axis of the vehicle.

Using a plurality of sensors 20, 22 of different sensitivity/size of the detection range ensures that both width 28 of parking space 11 (delimiting objects: vehicles 12) and depth 30 of parking space 11 (delimiting object: curb 14) are detectable with high accuracy even at high passing speeds (up to 30 km/h) and notwithstanding the use of inexpensive ultrasonic sensors. For especially first sensor 20 with its low sensitivity and small detection range 24 ensures an exact localization of vehicles 12 that delimit width 28 of parking space 11, and, in particular, the left front or rear sections of vehicles 12 facing parking space 11. A precise localization of these obstacles (vehicle corners) is of particular importance for the subsequent semi-autonomous/autonomous parking since a potential collision danger exists here during parking.

Second sensor 22 is mainly used to detect curb 14. However, it is also utilized to verify the parking-space localization results of first sensor 20.

Via selection of the repetition rate of the detection, the choice of sensor pot and adaptation of the sensitivity parameters, detection field 24 of first sensor 20 is selected such that the closest vehicle corner or obstacle corner is able to be localized very precisely, i.e., the sensitivity of the sensors is set to be relatively low, so that a highly restricted field of vision of the sensor results. This allows reliable localization of corners or obstacles. As a rule, first sensor 20 is preferably aligned at approximately 75° to 80° with respect to longitudinal axis of vehicle 10 due to the bumper geometry, so that an especially satisfactory sensing of the rear region of vehicle 12, which is passed when driving past parking space 11, is possible.

By adaptation of the sensitivity parameters, detection field 26 of second sensor 22 is selected in such a way that a high detection range is obtained, i.e., the sensor is set to be highly sensitive. For that reason, second sensor 22 is primarily used to detect curb 14 of transverse and longitudinal parking spaces. By suitable selection of the sensitivity characteristics curve in the range of 0.6 m to 1.2 m it is possible to ensure no, or barely any, ground echoes occur. The rear sensor is preferably aligned at an angle of 90° so as to provide excellent sensing of curb 14. In addition to this functionality, second sensor 22 is used to improve the corner localization of the parking-space measurement.

As schematically illustrated in FIGS. 1*b* and 1*c*, not only vehicles 12, which function as objects delimiting width 28 of parking space 11, but also curb 14, which delimits parking space 11 in its depth 30, are able to be localized in a very precise manner with the aid of sensors 20, 22 having different detection ranges 24 and 26. After vehicle 10 has driven past parking space 11, a semi-autonomous/autonomous parking assistant or some other information-processing system has very precise information at its disposal concerning both the position and the size of parking space 11. Only on the basis of this precise information, in particular the position of the corners of vehicles 12, is it possible to calculate a corresponding setpoint trajectory for the parking operation.

Setting a lower sensitivity for first sensor 20 and a higher sensitivity for second sensor 22 also ensures that first sensor 20 is less likely to detect ground echoes than second sensor 22. In the overlapping detection area of both sensors (up to approximately 3 m), filtering of ground echo values is able to be carried out by analyzing the two distance signals with the aid of a path signal sensor. To this end, position fixing of the sensors is implemented by analyzing a wheel-pulse counter.

Storing the data of first sensor 20 makes it is possible to filter the ground echo values if the data of second sensor 22 have been recorded. A prerequisite of such filtering is that less sensitive first sensor 20 is able to detect actual obstacles (vehicles 12), which may be ensured by appropriate selection of the sensitivity parameters of first sensor 20.

The present invention is not restricted to the exemplary embodiments shown, but additional development variants may also be realized by combining and modifying the mentioned means and features, without the scope of the present invention being left.

What is claimed is:

1. A method for determining a size and a position of a parking space in relation to a position of a vehicle while the vehicle is driving past the parking space, the parking space having a width extending longitudinally to a traffic lane and a depth extending transversely to the traffic lane, the method comprising:

determining the width of the parking space with the aid of a first ultrasonic sensor having a first sensitivity; and determining the depth of the parking space with the aid of a second ultrasonic sensor having a second sensitivity, the first sensitivity being less than the second sensitivity.

2. The method as recited in claim 1, wherein the first ultrasonic sensor has a smaller detection range than the second ultrasonic sensor.

3. The method as recited in claim 1, wherein at least one of:

the first ultrasonic sensor is aligned at an angle of approximately 70° to 80° with respect to a longitudinal axis of the vehicle, and the second ultrasonic sensor is aligned at one of an angle of 90° and an angle of virtually 90° with respect to the longitudinal axis of the vehicle.

4. The method as recited in claim 1, further comprising:

additionally determining the width of the parking space with the aid of the second ultrasonic sensor; and adjusting a result of the additional determining by a result of the determination of the width of the parking space with the aid of the first ultrasonic sensor.

5. The method as recited in claim 1, further comprising:

determining the position of the parking space in relation to the vehicle with the aid of at least one of at least one path signal sensor, at least one steering-angle sensor, and a yaw-rate sensor.

6. The method as recited in claim 1, further comprising:

filtering a ground-echo signal for a signal of the second ultrasonic sensor in comparison to a signal of the first ultrasonic sensor in an overlapping detection range of the first ultrasonic sensor and the second ultrasonic sensor.

7. A device for determining a size and a position of a parking space in relation to a position of a vehicle while the vehicle is driving past the parking space, the vehicle traveling forward in a traffic lane and the parking space having a width extending longitudinally to the traffic lane and a depth extending transversely to the traffic lane, the device comprising:

an arrangement for measuring a distance of an object in relation to the vehicle;

an arrangement for analyzing the measured distance;

a first ultrasonic sensor having a first sensitivity; and a second ultrasonic sensor having a second sensitivity, wherein the second ultrasonic sensor is aligned generally transverse to a longitudinal axis of the vehicle to determine the depth of the parking space.

8. The device as recited in claim 7, wherein the first ultrasonic sensor has a detection range that is different than a detection range of the second ultrasonic sensor.

9. The device as recited in claim 7, wherein:

the first ultrasonic sensor is arranged in a lateral front region of the vehicle, and the second ultrasonic sensor is arranged in a lateral rear region of the vehicle.

10. The device as recited in claim 9, wherein at least one of:

the first ultrasonic sensor is aligned at an angle of approximately 70° to 80° with respect to the longitudinal axis of the vehicle, and the second ultrasonic sensor is aligned at one of an angle of 90° and virtually 90° with respect to the longitudinal axis of the vehicle.

11. The device as recited in claim 7, further comprising at least one of:

a path-signal transmitting sensor;

a steering-angle sensor; and a yaw-rate sensor.

* * * * *